United States Patent
Sasaki et al.

(10) Patent No.: US 11,139,849 B2
(45) Date of Patent: Oct. 5, 2021

(54) ANTENNA MODULE

(71) Applicant: Yokogawa Electric Corporation, Tokyo (JP)

(72) Inventors: Hirokazu Sasaki, Tokyo (JP); Kensuke Hosoya, Tokyo (JP); Minoru Midorikawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 0 days.

(21) Appl. No.: 16/344,614

(22) PCT Filed: Oct. 25, 2017

(86) PCT No.: PCT/JP2017/038519
§ 371 (c)(1),
(2) Date: Apr. 24, 2019

(87) PCT Pub. No.: WO2018/079609
PCT Pub. Date: May 3, 2018

(65) Prior Publication Data
US 2020/0067555 A1 Feb. 27, 2020

(30) Foreign Application Priority Data
Oct. 28, 2016 (JP) .............................. JP2016-211231

(51) Int. Cl.
*H04B 1/38* (2015.01)
*H04B 1/3827* (2015.01)
*H04W 88/16* (2009.01)

(52) U.S. Cl.
CPC .......... *H04B 1/3827* (2013.01); *H04W 88/16* (2013.01)

(58) Field of Classification Search
CPC ........ H04B 1/3827; H04B 1/48; H04W 88/16
(Continued)

(56) References Cited

U.S. PATENT DOCUMENTS

2002/0061012 A1* 5/2002 Thi ....................... H04M 7/125
370/352
2011/0313549 A1* 12/2011 Emori ................. H04L 43/0817
700/81
(Continued)

FOREIGN PATENT DOCUMENTS

JP 2015-61134 A 3/2015
JP 2015061134 A * 3/2015 ............... H04B 1/48
(Continued)

OTHER PUBLICATIONS

Shuji Yamamoto et al., "World's First Wireless Field Instruments Based on ISA100.11a", Yokogawa Technical Report English Edition, 2010, pp. 75-78, vol. 53, No. 2.
(Continued)

*Primary Examiner* — Kevin M Burd
(74) *Attorney, Agent, or Firm* — Sughrue Mion, PLLC

(57) ABSTRACT

An antenna module which transmits and receives a radio signal via a wireless network, the antenna module includes an antenna configured to transmit and receive the radio signal, a circuit configured to convert a signal received from outside into a radio signal, make the antenna transmit the converted radio signal, and transmit a signal generated by processing the radio signal received by the antenna to the outside, a tubular casing configured to accommodate the circuit to cover a periphery of the circuit, an antenna accommodator provided at one end of the casing and configured to accommodate the antenna to allow the antenna to transmit and receive the radio signal, a connector joined to the casing and connectable to an external device which transmits and receives a signal to and from the circuit, a router configured to relay the signal processed by the circuit, and a gateway configured to communicatively connect the router and the external device connected to the connector.

10 Claims, 8 Drawing Sheets

(58) Field of Classification Search
USPC .......................................................... 375/219
See application file for complete search history.

(56) References Cited

U.S. PATENT DOCUMENTS

| | | | | |
|---|---|---|---|---|
| 2012/0002605 | A1* | 1/2012 | Yoshino | H04W 52/0229 |
| | | | | 370/328 |
| 2013/0272200 | A1* | 10/2013 | Takahashi | H04L 69/18 |
| | | | | 370/328 |
| 2014/0119290 | A1* | 5/2014 | Grewal | H04L 47/741 |
| | | | | 370/329 |
| 2016/0099841 | A1 | 4/2016 | Tiwari et al. | |
| 2016/0100437 | A1* | 4/2016 | Armstrong | G05B 19/4185 |
| | | | | 370/249 |
| 2016/0204824 | A1* | 7/2016 | Mochizuki | H04B 1/48 |
| | | | | 455/78 |
| 2016/0352592 | A1* | 12/2016 | Sasaki | H04L 43/0894 |
| 2017/0250836 | A1* | 8/2017 | Wang | H04L 12/66 |

FOREIGN PATENT DOCUMENTS

| | | | | |
|---|---|---|---|---|
| JP | 2015-146562 A | | 8/2015 | |
| JP | 2015146562 A | * | 8/2015 | ........... H04L 43/045 |
| JP | 5850015 B2 | | 2/2016 | |

OTHER PUBLICATIONS

International Search Report for PCT/JP2017/038519 dated Jan. 16, 2018 [PCT/ISA/210].

* cited by examiner

ANTENNA MODULE

TECHNICAL FIELD

The present invention relates to an antenna module.

This application is a National Stage of International Application No. PCT/JP2017/038519 filed Oct. 25, 2017, claiming priority from on Japanese Patent Application No. 2016-211231, filed Oct. 28, 2016, the entire contents of each of which are incorporated by reference herein in their enitreties.

BACKGROUND ART

A distributed control system (DCS) is constructed in plants, factories and the like, and thus an advanced automatic operation is realized. A distributed control system is a system in which a field device (a measuring device, or an actuator) called a field device and a control device for performing control thereof are connected to each other via a communication means. Most of field devices constituting such a distributed control system perform wired communication. However, in recent years, wireless field devices which perform wireless communication based on industrial wireless communication standards such as ISA 100.11a or WirelessHART (registered trademark) have also been realized.

For example, the wireless communication system based on ISA 100.11a includes the aforementioned wireless field device, a backbone router, a system manager, a gateway, and the like. The backbone router forms a wireless network with the wireless field device. The system manager manages the wireless communication performed via the wireless network. The gateway collects and decodes various kinds of data such as measurement data obtained by the wireless field device entering the wireless network, and encrypts and transmits various types of data such as control data for the wireless field device entering the wireless network.

The following Patent Literature 1 discloses a wireless communication system in which a backbone router is provided as an access point, and a system manager and a gateway are provided as an information processing device. The following Patent Literature 2 discloses an antenna module and a wireless device capable of making a field device having no wireless communication function a wireless field device, by adding a wireless communication function to a field device having no wireless communication function.

CITATION LIST

Patent Literature

[Patent Literature 1]
Japanese Unexamined Patent Application, First Publication No. 2015-146562
[Patent Literature 2]
Japanese Patent No. 5850015

SUMMARY OF INVENTION

Technical Problem

In recent years, a small-scale wireless communication system is also required in addition to a large-scale wireless communication system realized by the plant or the like disclosed in Patent Literature 1 mentioned above. For example, a wireless network is formed only in a limited range around a well source such as a gas field or an oil field, and such a small-scale wireless communication system is used for applications in which collection of measurement data, transmission of control data and the like for the wireless field device installed in the well source and its surroundings are performed via a wireless network.

It is not impossible to realize such a small-scale wireless communication system by the access point and the information processing device disclosed in the above-mentioned Patent Literature 1 or the like. However, since the access point and the information processing device disclosed in the above-mentioned Patent Literature 1 and the like are designed on the premise that it is installed in a plant or the like to realize a large-scale wireless communication system, the wireless communication system is large, heavy and expensive, and has high power consumption. Therefore, in some cases, it is difficult to install the access point and the information processing device disclosed in the above-mentioned Patent Literature 1 or the like, for example, in a constrained environment around the well source and to construct and operate a small-scale wireless communication system.

The above-mentioned small-scale wireless communication system can be realized not only outside the plant, but also inside a plant or the like. In a case in which the small-scale wireless communication system is realized inside a plant or the like, a plurality of small-scale wireless communication systems are provided inside the plant. Therefore, it is desirable that the access point and the device corresponding to the information processing device disclosed in the above-mentioned Patent Literature 1 or the like are easy to install.

An aspect of the present invention provides an antenna module that is compact and lightweight, easy to install, inexpensive and consumes low power.

Solution to Problem

An antenna module which transmits and receives radio signals via a wireless network according to a first aspect of the present invention may include an antenna configured to transmit and receive the radio signal, a circuit configured to convert a signal received from outside into a radio signal, make the antenna transmit the converted radio signal, and transmit a signal generated by processing the radio signal received by the antenna to the outside, a tubular casing configured to accommodate the circuit to cover a periphery of the circuit, an antenna accommodator provided at one end of the casing and configured to accommodate the antenna to allow the antenna to transmit and receive the radio signal, a connector joined to the casing and connectable to an external device which transmits and receives a signal to and from the circuit, a router configured to relay the signal processed by the circuit, and a gateway configured to communicatively connect the router and the external device connected to the connector.

The antenna module according to the first aspect may further include a manager configured to manage the wireless network.

In the antenna module according to the first aspect, the circuit may include a transmitter-receiver configured to receive the signal from the external device via the connector, output the signal to the gateway, and transmit a signal, which are output from the gateway, to the external device via the connector, and a radio signal processor configured to convert a signal, which is output from the router, into a radio signal, make the antenna transmit the converted radio signal, and output the signal generated by processing the radio signal received by the antenna to the router.

In the antenna module according to the first aspect, the gateway may be configured to output data, which is output from the transmitter-receiver, to the router, and output data, which is output from the router, to the transmitter-receiver.

In the antenna module according to the first aspect, the connector may include a power supply connector connectable to an external power supply.

In the antenna module according to the first aspect, the antenna accommodator may be configured to accommodate the antenna, the casing not covering a periphery of the antenna.

In the antenna module according to the first aspect, when a 3 dB half value angle of the antenna based on a plane orthogonal to an axis of the casing and including a feeding point of the antenna is set as θ, and an outer radius of the casing is set as ϕ, a shortest distance L between the feeding point of the antenna and the casing in an axial direction of the casing may be represented by the following formula (1):

$$L=\phi \times \tan\theta \qquad (1).$$

In an antenna module according to a second aspect of the present invention may include an antenna configured to transmit and receive the radio signal, a circuit configured to convert a signal received from outside into a radio signal, make the antenna transmit the converted radio signal, and transmit a signal generated by processing the radio signal received by the antenna to the outside, first and second tubular casings, at least one of which being configured to accommodate the circuit to cover a periphery of the circuit, an antenna accommodator provided between one end of the first casing and one end of the second casing, and configured to accommodate the antenna to allow the antenna to transmit and receive the radio signal, a first connector joined to the first casing and connectable to an external device which transmits and receives a signal to and from the circuit, a second connector joined to the second casing and connectable to the external device, a router configured to relay the signal processed by the circuit, and a gateway configured to connectively connect the router and the external device connected to the first connector or the second connector.

The antenna module according to the second aspect may further include a manager configured to manage the wireless network.

In the antenna module according to the second aspect, the circuit may include a transmitter-receiver configured to receive the signal from the external device via the first connector or the second connector, output the signal to the gateway, and transmit a signal, which is output from the gateway, to the external device via the first connector or the second connector, and a radio signal processor configured to convert a signal, which is output from the router, into a radio signal, make the antenna transmit the converted radio signal, and output the signal generated by processing the radio signal received by the antenna to the router.

In the antenna module according to the second aspect, the gateway may be configured to output data, which is output from the transmitter-receiver, to the router, and output data, which is output from the router, to the transmitter-receiver.

In the antenna module according to the second aspect, each of the first connector and the second connector may include a power supply connector connectable to an external power supply.

In the antenna module according to the second aspect, the antenna accommodator may be configured to accommodate the antenna, the first casing and the second casing not covering a periphery of the antenna.

In the antenna module according to the second aspect, when a 3 dB half value angle of the antenna based on a plane orthogonal to axes of the first casing and the second casing and including a feeding point of the antenna is set as θ, and an outer radius of each of the first casing and the second casing is set as ϕ, a shortest distance L between the feeding point of the antenna and each of the first casing and the second casing in an axial direction of the first casing and the second casing may be represented by the following formula (2):

$$L=\phi \times \tan\theta \qquad (2).$$

Advantageous Effects of Invention

According to an aspect of the present invention, since the router and the gateway are provided in the antenna module, and the function of forming the wireless network and the function of connecting the wireless network to the external device are realized by the antenna module alone, it is possible to provide an antenna module that is compact, lightweight, easy to install, inexpensive, and consumes low power.

DESCRIPTION OF EMBODIMENTS

Hereinafter, an antenna module according to some embodiments of the present invention will be described in detail with reference to the drawings.

First Embodiment

<Overall Configuration of Wireless Communication System>

Figure 1:
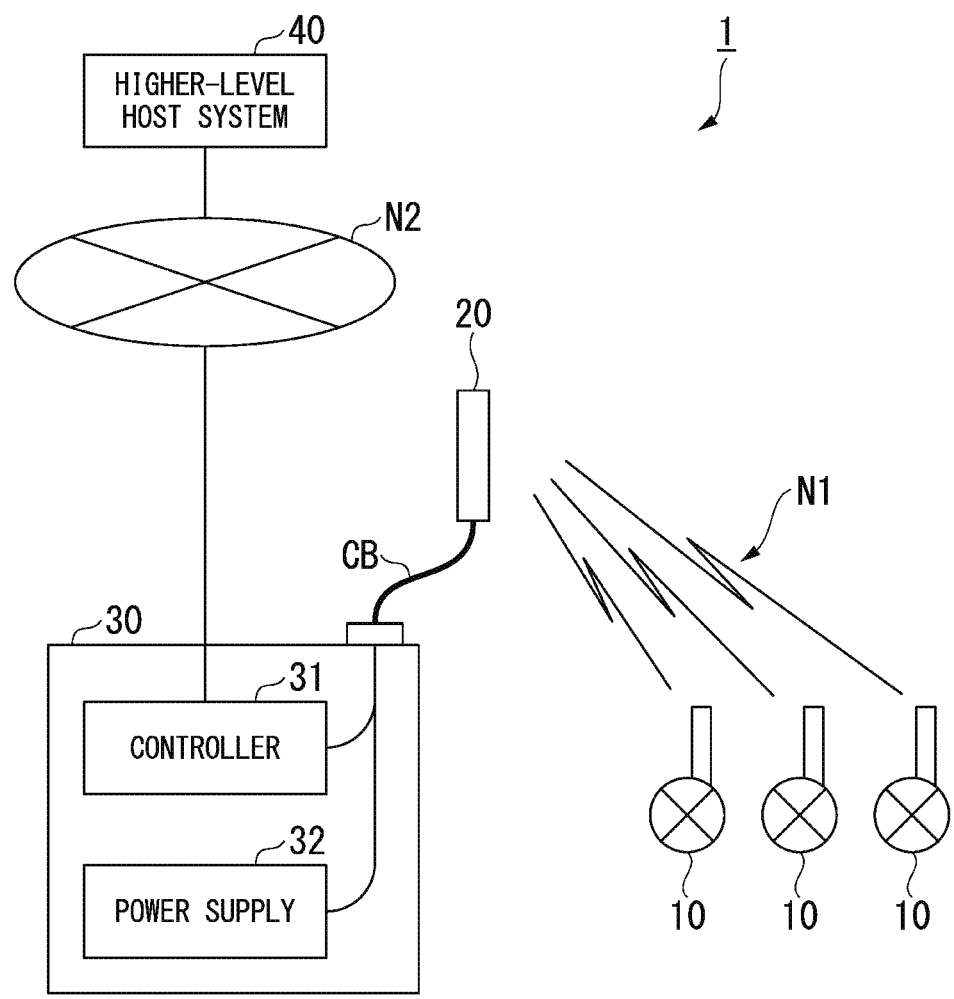
FIG. 1 is a block diagram showing an overall configuration of a wireless communication system in which an antenna module according to a first embodiment of the present invention is used.

FIG. 1 is a block diagram showing the overall configuration of the wireless communication system in which an antenna module according to a first embodiment of the present invention is used. As shown in FIG. 1, the wireless communication system 1 includes wireless field devices 10, an antenna module 20, a remote terminal device 30 (an external device), and a higher-level host system 40. The wireless communication system 1 is capable of performing a wireless communication, using a time division multiple access (TDMA) method via a wireless network N1.

The wireless communication system 1 is built in, for example, a plant, a factory, or the like. Hereinafter, when collectively referring to the plant, the factory, or the like, they are simply referred to as a "plant". In addition to an industrial plant such as a chemical plant, the aforementioned plant includes a plant that manages and controls a well source such as gas fields and oil wells and surroundings thereof, a plant that manages and controls a power generation such as a hydraulic power, a thermal power, and a nuclear power, a plant that manages and controls an environmental power generation such as sunlight and wind power, a plant that manages and controls water supply and sewerage, dams, and the like.

In the present embodiment, in order to facilitate understanding, the wireless communication system 1 is assumed to be constructed in the plant that manages and controls well sources such as gas fields and oil wells and surrounding thereof. In particular, the wireless field device 10, the antenna module 20, and the remote terminal device 30 that constitute the wireless communication system 1 are installed in a well source such as a gas field or an oil field, which is the site of the plant, or in the vicinity thereof, and the remaining higher-level host system 40 constituting the wireless communication system 1 is installed in a remote monitoring center away from the well source.

The wireless network N1 is formed in a limited range around the well source by the wireless field device 10 and the antenna module 20. The wireless network N1 is managed by the antenna module 20. In FIG. 1, although the figure is simplified, the number of the wireless field devices 10 forming the wireless network N1 is arbitrary. A network N2 shown in FIG. 1 is a network which connects the remote terminal device 30 and the higher-level host system 40. The network N2 is, for example, a wired or wireless backbone network that serves as a backbone of the wireless communication system 1.

The wireless field device 10 performs a measurement, an operation, and the like necessary for the process control under the control of the higher-level host system 40. In particular, the wireless field device 10 is, for example, a sensor device such as a flow meter or a temperature sensor, a valve device such as a flow control valve or an on-off valve, an actuator device such as a fan or a motor, an image pickup device such as a camera and a video for photographing a situation in the plant or an object, an acoustic device such as a microphone or a speaker for collecting abnormal sounds or the like in the plant or issuing an alarm sound, a position detection device for outputting position information of each device, and other devices. The wireless field device 10 performs a power-saving operation (for example, an intermittent operation) using a battery as a power supply, and is able to perform the wireless communication, using the TDMA method based on the wireless communication standard ISA 100.11a.

Figure 2:
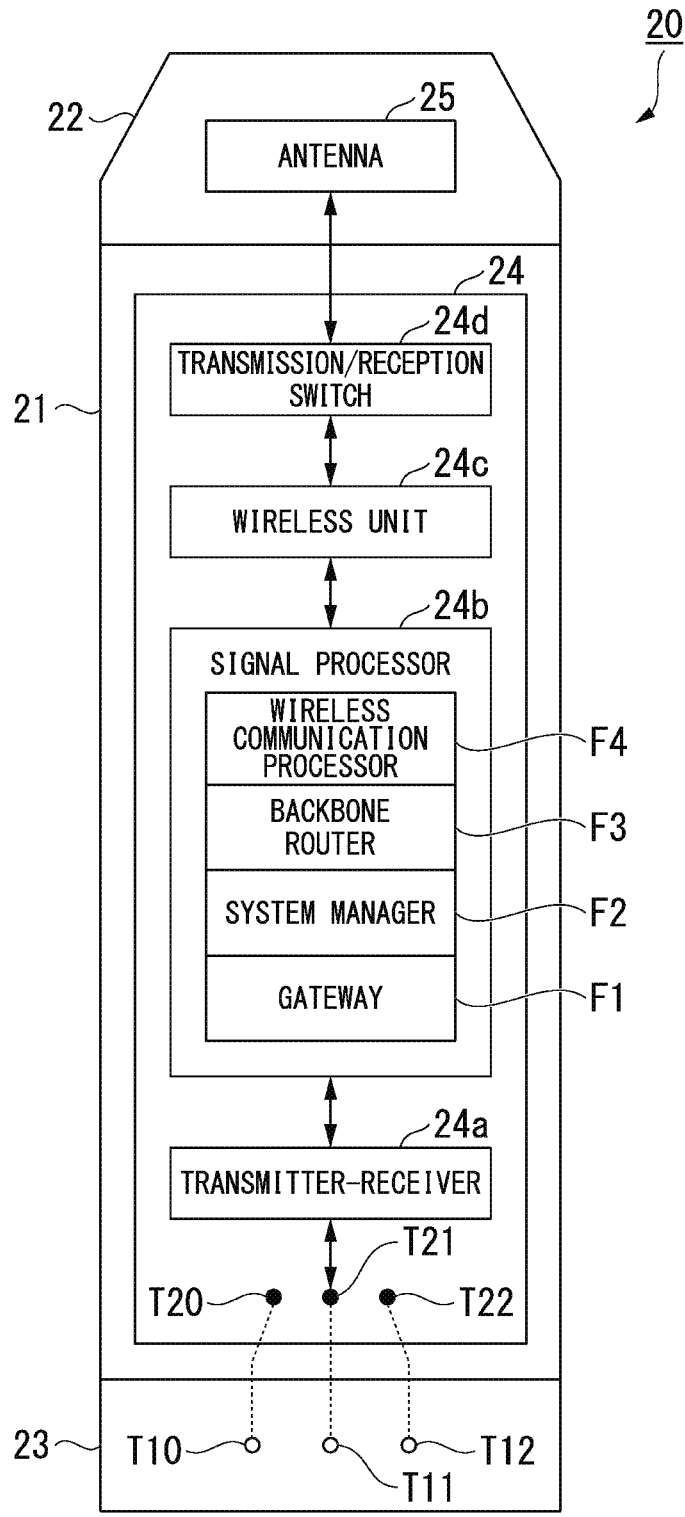
FIG. 2 is a block diagram showing a configuration of a main part of the antenna module according to the first embodiment of the present invention.

As shown in FIG. 2, the antenna module 20 includes an antenna 25 for transmitting and receiving radio signals, and performs transmission and reception of the radio signals via the wireless network N1. In particular, the antenna module 20 receives the radio signal transmitted from the wireless field device 10 via the wireless network N1 with the antenna 25, processes the received radio signal, and transmits the radio signal toward the remote terminal device 30. The antenna module 20 receives the signal transmitted from the remote terminal device 30, and transmits the received signal from the antenna 25 to the wireless field device 10 by converting the received signal into the radio signals. The antenna module 20 operates with electric power supplied from a power supply 32 provided in the remote terminal device 30, and is capable of performing the wireless communication, using the TDMA method based on the wireless communication standard ISA100.11a, like the wireless field device 10. Details of the power supply 32 will be described below.

The antenna module 20 is connected to the remote terminal device 30 via a cable CB and communicates with the remote terminal device 30 via the cable CB. The cable CB is a multi-core shielded cable having, for example, a power supply line, a signal line, and a ground line. The cable CB is desirably a cable capable of performing the communication using a differential signal (for example, a half-duplex communication). For example, a serial communication cable based on RS-485 or the like can be used as the cable CB. By utilizing such a cable CB, for example, it is possible to install the antenna module 20 at a position away from the remote terminal device 30 by about several tens [cm] to several hundreds [m].

The antenna module 20 communicates with the remote terminal device 30 via the cable CB. In particular, the antenna module 20 communicates with the remote terminal device 30 by a command response method. For example, the antenna module 20 performs the communication by the command response method, using a Modbus (registered trademark) protocol or a HART (registered trademark) protocol.

FIG. 1 shows an example in which the antenna module 20 and the remote terminal device 30 are connected to each other by the cable CB. However, it is also possible to directly connect the antenna module 20 to the remote terminal device 30 by a connector 23 of FIG. 2, without using the cable CB. When the antenna module 20 and the remote terminal device 30 are connected using the cable CB, it is possible to enhance the degree of freedom of the installation place of the antenna module 20. In contrast, when the antenna module 20 is directly connected to the remote terminal device 30 without using the cable CB, since the antenna module 20 and the remote terminal device 30 are compact, handling is easy. Details of the antenna module 20 will be described below.

The remote terminal device 30 includes a controller 31 and a power supply 32. The remote terminal device 30 controls the wireless field device 10 and the antenna module 20 under the higher-level host system 40, and supplies the power to the antenna module 20. The controller 31 is, for example, a remote monitoring control unit (RTU: Remote Terminal Unit), transmits various types of data, such as measurement data transmitted from the wireless field device 10 and received by the antenna module 20, to the higher-level host system 40, and transmits various types of data, such as control data transmitted from the higher-level host system 40, to the wireless field device 10 via the antenna module 20.

The power supply 32 supplies the electric power to the antenna module 20. As shown in FIG. 1, when the antenna module 20 and the remote terminal device 30 are connected to each other by the cable CB, the power supply 32 supplies the electric power to the antenna module 20 via the cable CB. As the power supply 32, for example, it is possible to use a primary battery or a secondary battery with extremely low self-discharge such as a lithium thionyl chloride battery, a fuel cell, a capacitor, or a power generation circuit performing the environmental power generation which is an energy harvest such as a so-called solar battery. The power supply 32 may be built in the remote terminal device 30 or may be provided outside the remote terminal device 30.

The higher-level host system 40 communicates with the remote terminal device 30 via the network N2, collects various kinds of information of the wireless field device 10 and the antenna module 20 via the remote terminal device 30, and controls the wireless field device 10 and the antenna module 20 via the remote terminal device 30. The higher-level host system 40 is, for example, a distributed control system (DCS) or a supervisor control and data acquisition (SCADA).

<Antenna Module>

FIG. 2 is a block diagram showing a configuration of a main part of the antenna module according to the first embodiment of the present invention. As shown in FIG. 2, the antenna module 20 includes a casing 21, an antenna cap 22 (an antenna accommodator), a connector 23, a circuit 24, and an antenna 25. The antenna module 20 is a module having an outer shape of a columnar shape or a polygonal column shape (for example, a quadrangular prism shape). Since the outer shape of the antenna module 20 is formed in a columnar shape, it can be directly connected to the remote terminal device 30, like an antenna such as a sleeve antenna and a whip antenna provided in a wireless device of related art.

The casing 21 is, for example, a tubular member having a cylindrical shape, a polygonal tubular shape or the like formed of a metal having high rigidity such as high rigidity aluminum. The casing 21 accommodates the circuit 24 to cover the periphery of the circuit 24. The reason why the periphery of the circuit 24 is covered with the metallic casing 21 is that the unnecessary radiation such as the spurious of higher harmonic generated in the circuit 24 is suppressed from leaking to the outside of the antenna module 20 as much as possible, thereby preventing adverse influence on other wireless devices located in the surroundings.

The casing 21 is filled with resin inside to satisfy the intrinsic safety explosion-proof standard. That is, the circuit 24 accommodated inside the casing 21 is sealed with resin filled in the casing 21. If resin is filled in the casing 21, increase in the cost and weight of the antenna module 20 is caused. Accordingly, resin may be partially coated so that only a surface layer of the circuit 24 is coated with resin without filling the inside of the casing 21 with resin.

The antenna cap 22 is a resin member that accommodates the antenna 25 therein, has an outer diameter that is approximately the same as the outer diameter of the casing 21, and is provided at one end of the casing 21. The antenna cap 22 accommodates the antenna 25 so that the antenna 25 is disposed outside the casing 21, that is, the casing 21 does not cover the periphery of the antenna 25. This is to prevent the radio signal transmitted from the antenna 25 or the radio signal to be received by the antenna 25 from being intercepted by the casing 21 so that the antenna 25 can transmit and receive the radio signal. The antenna cap 22 is not limited to resin and may be a material that transmits the radio signal.

The connector 23 is a connecting unit which connects the antenna module 20 to the cable CB or the remote terminal device 30, and is joined to the other end of the casing 21. In particular, when the connector 23 is screwed or fitted with an external connector such as a connector provided at the end of the cable CB or a connector provided on the remote terminal device 30, the antenna module 20 is fixed and electrically connected to the cable CB or the remote terminal device 30.

The connector 23 includes a plurality of connecting terminals T10 to T12 connected to the circuit 24. The electric power is received from the remote terminal device 30, and signals transmitted and received between the antenna module 20 and the remote terminal device 30 are input and output via the connecting terminals T10 to T12. In particular, the connecting terminal T10 is a power supply connecting terminal (a power supply connector) connected to the power supply input terminal T20 of the circuit 24. A connecting terminal T11 is a signal connecting terminal connected to a signal input/output terminal T21 of the circuit 24. The connecting terminal T12 is a ground connecting terminal connected to a ground terminal T22 of the circuit 24. Since it is conceivable that the antenna module 20 is installed outdoors, it is desirable to use a connector suitable for the waterproof and dustproof standards such as an IP (International Protection) standard and a NEMA (National Electrical Manufacturers Association) standard, as the connector 23.

The circuit 24 includes a transmitter-receiver 24a, a signal processor 24b, a wireless unit 24c (a radio signal processor), and a transmission/reception switch 24d. The circuit 24 receives a signal transmitted from the outside, for example, from the remote terminal device 30 via the connector 23, and transmits the signal from the antenna 25 as a radio signal. In addition, the circuit 24 transmits the signals processed to the radio signals received by the antenna 25 to the outside, for example, the remote terminal device 30 via the connector 23.

The transmitter-receiver 24a performs communication using, for example, a command response method with the outside, for example, with the remote terminal device 30. In particular, the transmitter-receiver 24a receives the signal from outside transmitted via the connector 23, for example, a signal transmitted from the higher-level host system 40 via the network N2 and the remote terminal device 30, and outputs the signal to the signal processor 24b. The transmitter-receiver 24a transmits the signal that is output from the signal processor 24b, for example, a signal to be transmitted to the higher-level host system 40 via the remote terminal device 30 and the network N2, via the connector 23.

The signal processor 24b performs predefined signal processing on the signal from the transmitter-receiver 24a or the signal from the wireless unit 24c. In particular, the signal processor 24b performs a synchronization process, a data conversion process, a conversion process of the communication protocol, an encryption process, a modulation process, and the like on the signal from the transmitter-receiver 24a. The signal processor 24b performs a demodulation process, a decoding process, a conversion process of the communication protocol, a data conversion process, a synchronization process, and the like on the signal from the wireless unit 24c. The signal processor 24b also performs a switching control of the transmission/reception switch 24d.

The signal processor 24b includes a gateway F1, a system manager F2 (a manager), a backbone router F3 (a router), and a wireless communication processor F4 (a radio signal processor). The gateway F1 connects the system manager F2 and the backbone router F3 to the remote terminal device 30 in a communicable manner. The gateway F1 relays various types of data input and output by the system manager F2 and the backbone router F3, and various types of data transmitted and received by the cable CB or the remote terminal device 30.

The gateway F1 encrypts the data that is output from the transmitter-receiver 24a to output the data to the backbone router F3, and decodes the data that is output from the backbone router F3 to output the data to the transmitter-receiver 24a. The reason why the gateway F1 performs such encryption is to ensure security of wireless communication performed via the wireless network N1.

The gateway F1 can output its own information to the outside in response to the request from the outside, for example, in response to the request from the higher-level host system 40. Examples of the own information that is output from the gateway F1 include an access counter value indicating the number of times of communication using the transmitter-receiver 24a, information indicating an operating state, information indicating an abnormality occurrence, identification information such as a device tag, and the like.

The system manager F2 manages the wireless network N1. In particular, the system manager F2 controls allocation of communication resources (time slots and communication channels) to the wireless field device 10, the gateway F1 and the backbone router F3, thereby realizing the wireless communication using the TDMA via the wireless network N1. The system manager F2 performs a process of determining whether the wireless field device 10 is made to enter the wireless network N1, that is, a join process.

The system manager F2 is capable of outputting information on the wireless field device 10 to the outside, in accordance with the request from the outside, for example, the request from the higher-level host system 40. Information on the wireless field device 10 that is output from the system manager F2 includes, for example, information indicating the connection state to the wireless network N1, information indicating the battery life, information indicating the achievement level of the process data, information indicating communication quality such as packet error rate (PER) and received signal strength indicator (RSSI), and diagnosis information such as self-diagnosis information of the wireless field device 10. Information on the wireless field device 10 may be stored in the gateway F1, and the gateway F1 may output the information to the outside in accordance with the request from the outside.

The backbone router F3 forms a wireless network N1. The backbone router F3 connects the wireless network N1 to the gateway F1 and the system manager F2, and relays data transmitted and received between the wireless network N1, the gateway F1 and the system manager F2. The backbone router F3 performs the transmission process of advertisement on the wireless network N1. The advertisement is information necessary for causing the wireless field device 10 to enter the wireless network N1. The backbone router F3 also realizes the wireless communication based on the aforementioned wireless communication standard ISA 100.11a.

The wireless communication processor F4 performs processing required for performing the wireless communication via the wireless network N1. The wireless communication processor F4 performs, for example, the synchronization process, the modulation process, and the like on the signal from the backbone router F3. The wireless communication processor F4 performs the demodulation process, the synchronization process, and the like on the signal from the wireless unit 24c. The wireless communication processor F4 also performs the above-described switching control of the transmission/reception switch 24d.

The wireless unit 24c generates a radio signal to be transmitted from the antenna 25, using the signal from the signal processor 24b. The wireless unit 24c performs a process of receiving the radio signal from the antenna 25. In particular, the wireless unit 24c performs the synchronization process, the encryption process, the frequency conversion process, and the like on the signal from the signal processor 24b. The wireless unit 24c performs the frequency conversion process, the decoding process, the synchronization process, and the like on the radio signal from the antenna 25.

The transmission/reception switch 24d switches the transmission and reception of the radio signal under the control of the signal processor 24b. In particular, at the time of transmission of the radio signal, the transmission/reception switch 24d switches a transmission path of the radio signal so that the radio signal generated by the wireless unit 24c is input to the antenna 25, and at the time of reception of the radio signal, the transmission/reception switch 24d switches the transmission path of the radio signal so that the radio signal received by the antenna 25 is input to the wireless unit 24c.

The antenna 25 is connected to the transmission/reception switch 24d, and transmits the radio signal from the transmission/reception switch 24d. The antenna 25 receives the radio signal transmitted via the wireless network N1, and outputs the radio signal to the transmission/reception switch 24d. The antenna 25 may be a small antenna accommodated in the antenna cap 22. For example, it is possible to use a microstrip antenna formed on a substrate.

Like the wireless field device 10, the antenna module 20 is able to perform a power-saving operation such as an intermittent operation. For example, the antenna module 20 is able to perform an operation of releasing a sleep state (a low power consumption state) when reaching a predefined wireless communication timing, and shifting to the sleep state when the wireless communication is completed. The predefined wireless communication timing is, for example, the timing at which the antenna module 20 performs the transmission and reception of the radio signals with the wireless field device 10. Alternatively, the antenna module 20 is able to perform an operation of releasing the sleep state when the transmitter-receiver 24a of the circuit 24 receives the request from the outside, for example, the remote terminal device 30, and shifting to the sleep state when returning the response to the outside. The sleep state of the antenna module 20 refers to a state in which the power consumption of the circuit 24 except the transmitter-receiver 24a is reduced or a zero state.

Figure 4:
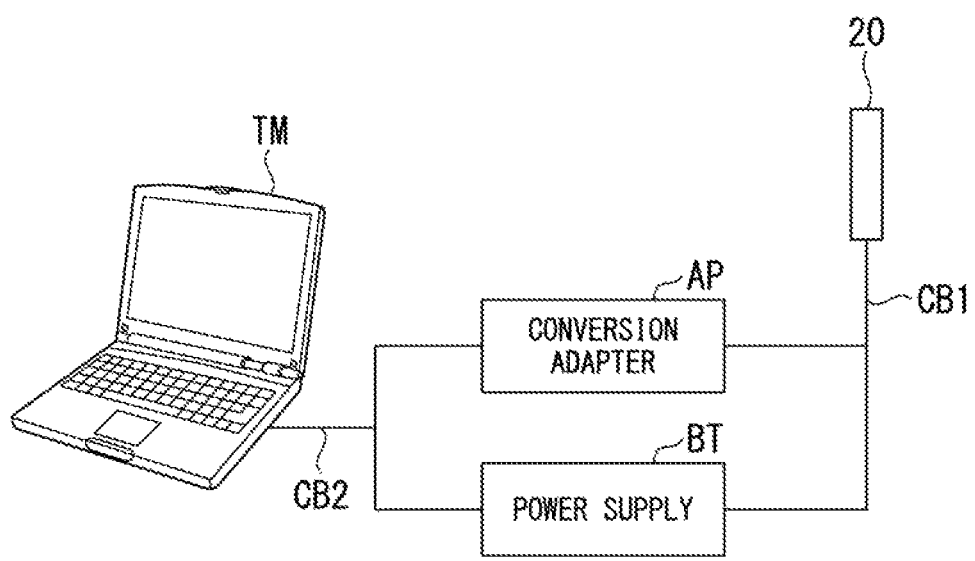
FIG. 4 is a diagram showing a setting method before operation of the antenna module according to the first embodiment of the present invention.

The antenna module 20 can transmit various commands to the wireless field device 10 connected to the wireless network N1, on the basis of an external instruction, for example, an instruction of the higher-level host system 40 or the terminal device TM shown in FIG. 4. Commands transmitted from the antenna module 20 to the wireless field device 10 include a command instructing to update the firmware, a command instructing the restart, a command instructing acquisition of the device information, a command instructing to initialize the battery usage amount, a command instructing an acquisition of a log, and the like.

<Attaching Position of Antenna in Antenna Module>

Figure 3A:
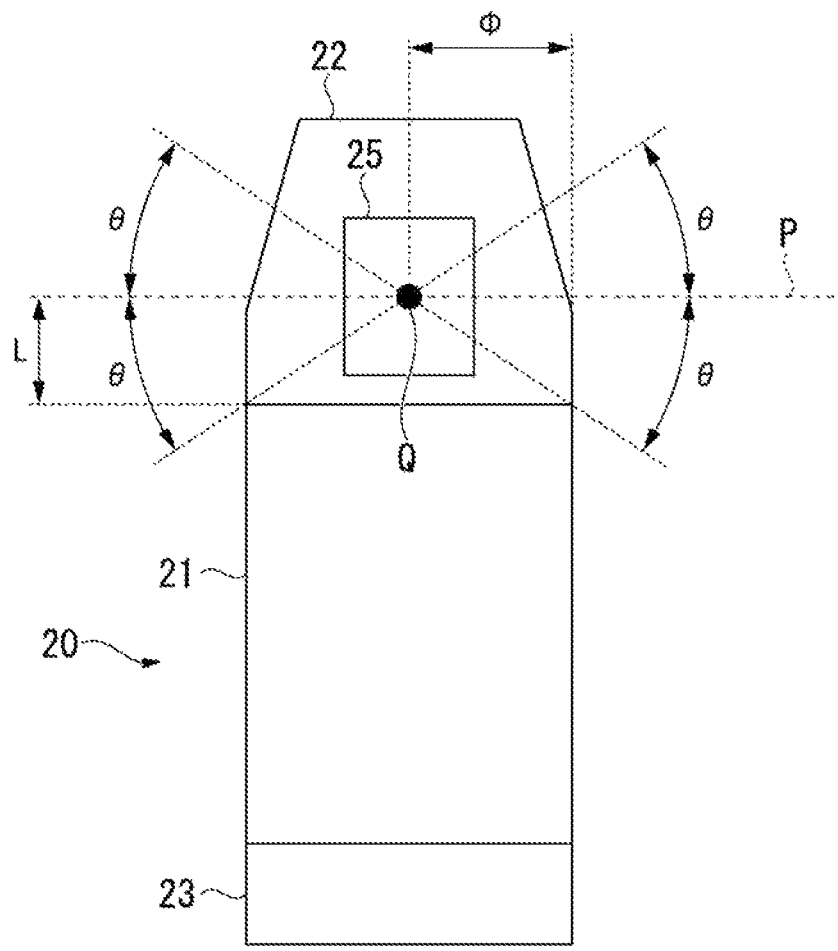
FIG. 3A is a view showing an attaching position of an antenna of the antenna module according to the first embodiment of the present invention.
Figure 3B:
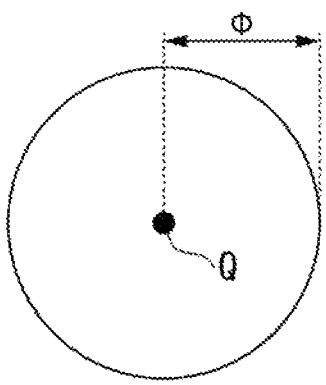
FIG. 3B is a view showing the attaching position of the antenna of the antenna module according to the first embodiment of the present invention.
Figure 3C:
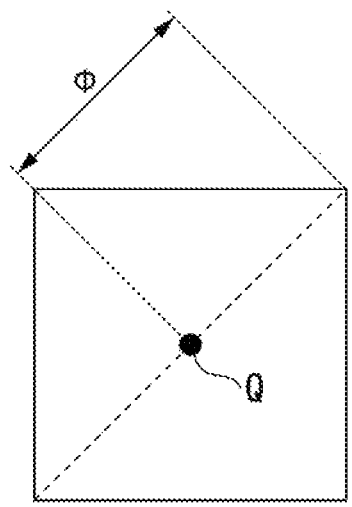
FIG. 3C is a view showing the attaching position of the antenna of the antenna module according to the first embodiment of the present invention.

FIGS. 3A, 3B, and 3C are diagrams showing attaching positions of the antennas of the antenna module according to the first embodiment of the present invention. For simplicity of explanation, a case in which the antenna 25 is omni-directional on a plane orthogonal to the axis of the casing 21, that is, within a reference plane P in FIG. 3A will be described as an example.

As shown in FIG. 3A, the reference plane P is orthogonal to the axis of the casing 21 and includes a feeding point Q of the antenna 25. A 3 dB half value angle of the antenna 25 based on the reference plane P is defined as θ, and an outer radius of the casing 21 is defined as ϕ. The antenna 25 is attached to a position at which a distance between the feeding point Q in the axial direction of the casing 21 and the casing 21 is the shortest distance L represented by the following formula (3).

$$L = \phi \times \tan\theta \times \alpha \quad (3)$$

When the outer diameter shape of the casing 21 is a cylindrical shape, as shown in FIG. 3B, the outer radius α of the casing 21 becomes a distance from the feeding point Q located on the axis of the casing 21 to the outer periphery of the casing 21. In contrast, when the outer diameter shape of the casing 21 is a square cylinder shape, as shown in FIG. 3C, the outer radius ϕ of the casing 21 becomes half the length of the diagonal passing through the feeding point Q located on the axis of the casing 21.

The variable α on the right side of the above formula (2) is a constant indicating a margin considering mechanical manufacturing errors and the like. That is, this variable α is defined to make it difficult for the radio signal radiated from the antenna 25 to be affected by the casing 21, that is, to prevent the radio signal from being intercepted by the casing 21. In particular, the variable α is determined in consideration of a radiation angle of the radio signal radiated from the antenna 25, that is, the accuracy of the angle with respect to the reference plane P, the manufacturing accuracy of the casing 21, the manufacturing accuracy of the circuit 24, and the like. For example, the value "1.05" is set as the variable α. When the margin is not considered, that is, when α=1, the formula (3) is equal to the formulas (1) and (2).

The reason why the antenna 25 is attached to the aforementioned position is to suppress unnecessary radiation as much as possible without affecting the performance of the antenna 25. That is, when the antenna 25 is attached to a position at which the distance between the feeding point Q and the casing 21 is shorter than the shortest distance L, the radio signal is blocked by the casing 21 formed of metal, resulting in performance degradation of the antenna 25. In contrast, when the antenna 25 is attached to a position at which the distance between the feeding point Q and the casing 21 becomes longer than the shortest distance L, unnecessary radiation increases. Therefore, the antenna is attached to the aforementioned position. As long as unnecessary radiation is acceptable, the antenna 25 may be attached to a position at which the distance between the feeding point Q and the casing 21 is slightly longer than the shortest distance L.

<Setting Method Before Operation>

FIG. 4 is a diagram showing a setting method before operation of the antenna module according to the first embodiment of the present invention. When setting the antenna module 20, as shown in FIG. 4, the antenna module 20, the conversion adapter AP and the power supply BT are connected by the cable CB1, and the conversion adapter AP, the power supply BT and the terminal device TM (an external device) are connected by the cable CB2. That is, prior to the operating state shown in FIG. 1, the antenna module 20 is connected as shown in FIG. 4 and various settings are performed. The cable CB1 is similar to the cable CB shown in FIG. 1, and is, for example, a serial communication cable based on RS-485 or the like. The cable CB2 is, for example, a universal serial bus (USB) cable.

The conversion adapter AP connects the terminal device TM to the antenna module 20 to enable communication. The conversion adapter AP is, for example, an adapter which mutually converts an electrical specification defined by RS-485 and an electrical specification defined by USB. The electrical specification mentioned here is an electrical specification of the physical layer in the OSI reference model. The power supply BT supplies the electric power necessary for operating the antenna module 20. In a case in which an electric power which is a so-called bus power supplied from the terminal device TM via the cable CB2 can be used, the power supply BT can be omitted.

The terminal device TM is a device for setting the antenna module 20 and the wireless field device 10. As the terminal device TM, it is possible to use a personal computer having a USB terminal to which the cable CB2 (a USB cable) is connected. Since it is considered that the setting for the antenna module 20 is often performed at the well source such as a gas field or an oil field which is a site of a plant in which the antenna module 20 is installed or in the vicinity thereof, it is desirable to use a notebook type or tablet type personal computer.

When an operator operates the terminal device TM and inputs various instructions in the connected state shown in FIG. 4, the writing request of the setting information corresponding to the instruction to be input is transmitted to the antenna module 20 via the cable CB2, the conversion adapter AP, and the cable CB1 in order. In the antenna module 20, a process for setting the setting information is performed in accordance with the write request transmitted from the terminal device TM. For example, the device information of the wireless field device 10 made to enter the wireless network N1, the connection setting information with the controller 31, and the like are set in the circuit 24 of the antenna module 20.

Examples of the device information of the wireless field device 10 set in the antenna module 20 include the following items.

Identification information uniquely assigned to the wireless field device 10

Communication cycle and the communication frequency for performing the wireless communication with the wireless field device 10

Address of the wireless field device 10

Determination value of communication abnormality

Communication items

Examples of the connection setting information with the controller 31 set in the antenna module 20 include the following items.

Identification information for identifying the controller 31

Communication rate when communicating with the controller 31

Address of the controller 31

Communication format

<Action after Start of Operation>

When the setting for the antenna module 20 is completed by the setting method described above, the antenna module 20 is detached from the cable CB1 shown in FIG. 4 and is connected to the remote terminal device 30, using the cable CB. As shown in FIG. 1, the antenna module 20 is connected to the higher-level host system 40 via the remote terminal device 30 and the network N2. When the electric power of the power supply 32 provided in the remote terminal device 30 is supplied to the antenna module 20 via the cable CB, as shown in the timing chart of FIG. 5, transmission of the advertisement from the backbone router F3 of the antenna module 20 is started.

Figure 5:
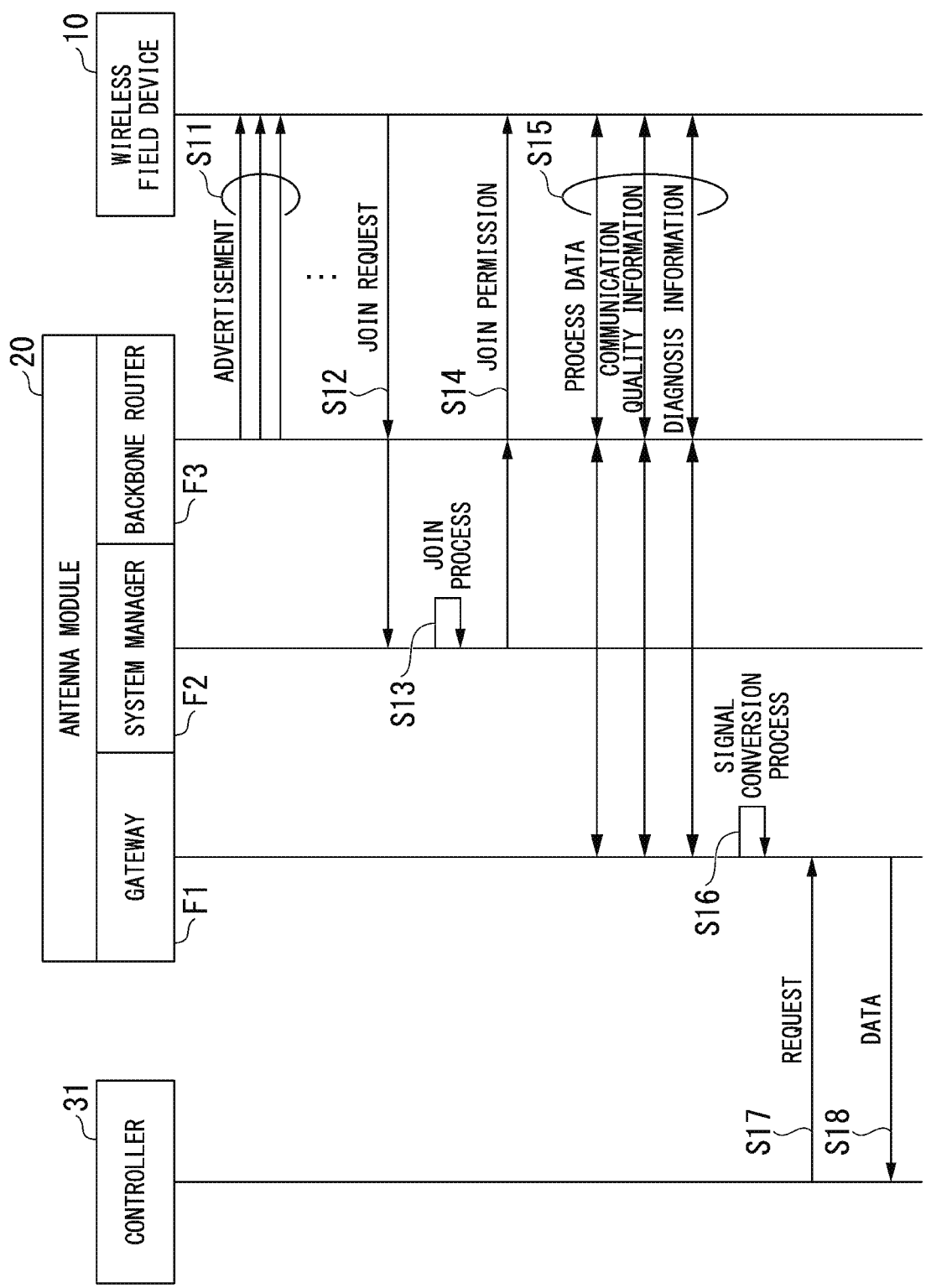
FIG. 5 is a timing chart showing an operation of the antenna module according to the first embodiment of the present invention after the operation is started.

FIG. 5 is a timing chart showing the action of the antenna module according to the first embodiment of the present invention after the operation starts. As shown in FIG. 5, the advertisement is regularly transmitted from the backbone router F3 of the antenna module 20 (step S11). When the power of the wireless field device 10 is turned on, the wireless field device 10 enters a reception waiting state of advertisement (Discovery state). When the wireless field device 10 receives the advertisement transmitted from the antenna module 20, a join request (an entry request) to the wireless network N1 is transmitted from the wireless field device 10 to the antenna module 20 (step S12).

When the join request from the wireless field device 10 is received by the antenna module 20, the received join request is delivered from the backbone router F3 to the system manager F2. Further, in the system manager F2, a process (a join process) as to whether the wireless field device 10 is made to enter the wireless network N1 is performed (step S13). When the wireless field device 10 that has transmitted the join request is authenticated by the join process, a join permission indicating permission of the entry into the wireless network N1 is transmitted from the system manager F2 to the wireless field device 10 via the backbone router F3 (step S14). When receiving the join permission from the antenna module 20, the wireless field device 10 is in the state of entering the wireless network N1.

When the wireless field device 10 enters the wireless network N1, communication is performed between the antenna module 20 and the wireless field device 10, and a process for acquiring process data, communication quality information, and diagnosis information from the wireless field device 10 is performed by the antenna module 20 (step S15). In particular, the process of acquiring the process data is performed by the gateway F1 of the antenna module 20, and the process of acquiring the communication quality information and the diagnosis information is performed by the system manager F2 of the antenna module 20. The communication quality information and diagnosis information acquired by the system manager F2 are delivered to the gateway F1. Therefore, in FIG. 5, the figure is simplified, and the data and various kinds of information acquired from the wireless field device 10 are shown as being input to the gateway F1.

When the aforementioned process is completed, the process of converting the process data, communication quality information, and diagnosis information acquired from the wireless field device 10 into a signal that can be transmitted to the controller 31 is performed by the gateway F1 (step S16). After the conversion process as described above is finished, when a transmission request (a request) of the signal is transmitted from the controller 31 to the antenna module 20 (step S17), the gateway F1 of the antenna module 20 transmits the signal of request from the controller 31 toward the controller 31 (step S18). The controller 31 transmits the signal transmitted from the antenna module 20 as necessary toward the higher-level host system 40.

As described above, in the present embodiment, the gateway F1, the system manager F2, and the backbone router F3 are provided in the antenna module 20, and the function of forming and managing the wireless network N1 and the function connecting the wireless network N1 to the network N2 are realized by the antenna module 20 alone. Therefore, it is possible to realize an antenna module which is compact, lightweight and easy to install. Since the gateway F1, the system manager F2, and the backbone router F3 are provided in the antenna module 20, the antenna module can be inexpensive and have low power consumption, as compared with a case in which the functions of the respective units are achieved as separate devices. In the present embodiment, since the antenna module 20 can operate with low power consumption like the wireless field device 10, the power consumption can be further suppressed.

Second Embodiment

Figure 6:
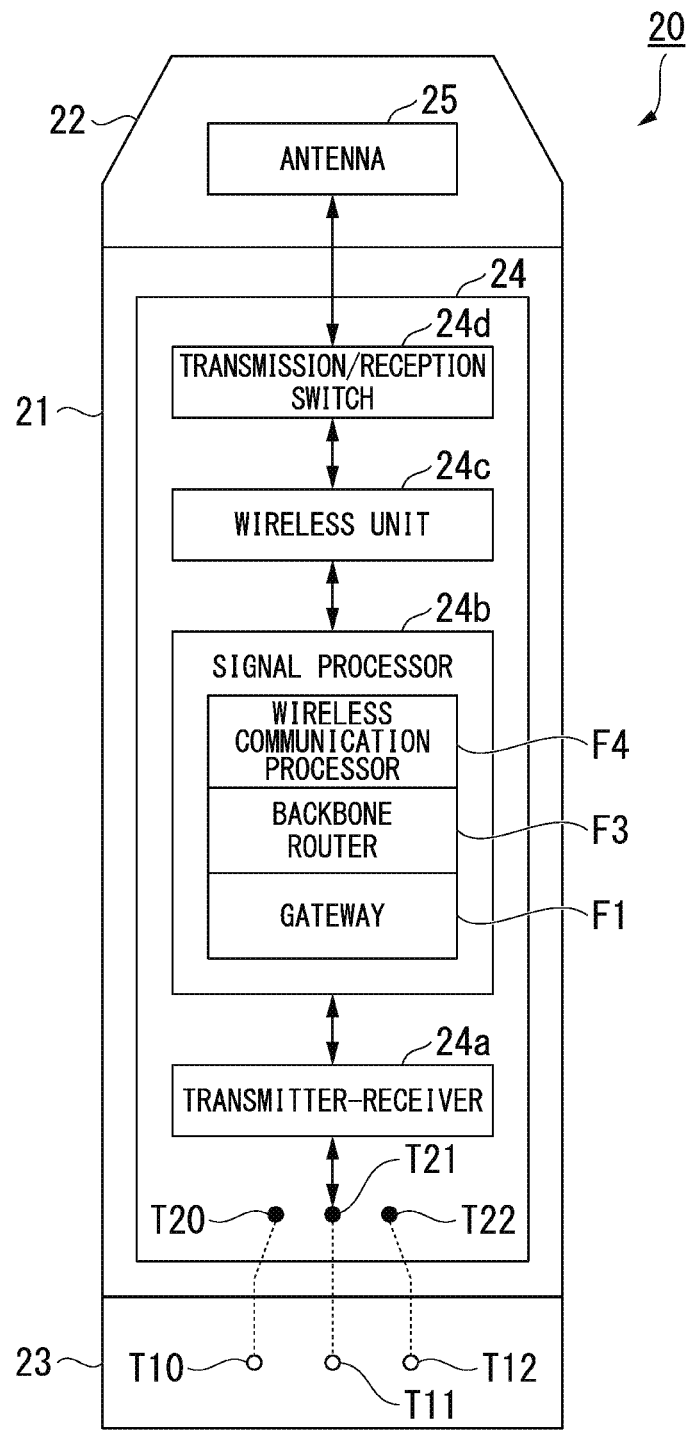
FIG. 6 is a block diagram showing a configuration of a main part of an antenna module according to a second embodiment of the present invention.

FIG. 6 is a block diagram showing a configuration of a main part of an antenna module according to a second embodiment of the present invention. In FIG. 6, the same components as those shown in FIG. 2 are denoted by the same reference numerals. As shown in FIG. 6, the system manager F2 of the antenna module 20 shown in FIG. 2 is omitted in an antenna module 20 of the present embodiment.

Such an antenna module 20 is suitable, for example, for applications in which the number of wireless field devices 10 to be connected is small and it is not necessary to control allocation of a complicated communication resource to the wireless field device 10. Since the system manager F2 is omitted from the antenna module 20 of the present embodiment, for example, communication resources used for communication with the wireless field device 10 are fixed in advance, and communication is performed, using only a fixed communication resource.

In the present embodiment, the gateway F1 and the backbone router F3 are provided in the antenna module 20, and the function of forming the wireless network N1 and the function of connecting the wireless network N1 to the network N2 are realized by the antenna module 20 alone. Therefore, it is possible to realize an antenna module which is compact and lightweight and easy to install. In the present embodiment, as in the first embodiment, low cost and low power consumption can be achieved.

Third Embodiment

Figure 7:
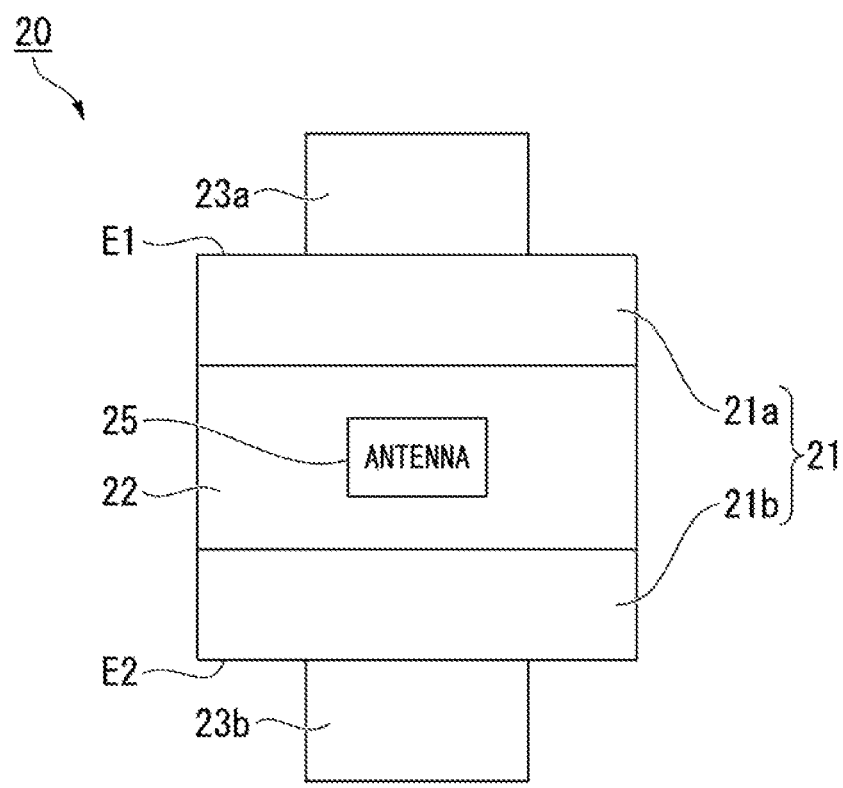
FIG. 7 is a view schematically showing an antenna module according to a third embodiment of the present invention.

FIG. 7 is a diagram schematically showing an antenna module according to a third embodiment of the present invention. In FIG. 7, the configurations corresponding to those shown in FIGS. 2 and 6 are denoted by the same reference numerals. In the antenna module 20 of the first and second embodiments described above, the antenna 25 is accommodated in the antenna cap 22 provided at one end of the casing 21. In contrast, in the antenna module 20 of the present embodiment, an antenna 25 is accommodated in an antenna cap 22 provided between both ends of the casing 21, that is, between an end E1 and an end E2. The antenna module 20 includes two connectors 23a and 23b.

The casing 21 includes two casings 21a and 21b. Like the casing 21 of the antenna module 20 according to the first and second embodiments, the casings 21a and 21b are, for example, members formed of a metal having high rigidity such as high rigidity aluminum and having a tubular shape such as a cylindrical shape or a polygonal shape. The casings 21a and 21b accommodate the circuit to cover the periphery of the circuit (not shown). The circuit may be accommodated in either one of the casings 21a and 21b or both the casings 21a and 21b. The inside of the casings 21a and 21b may be filled with resin to satisfy the intrinsic safety explosion-proof standard.

The antenna cap 22 is a resin member formed into an annular or polygonal annular shape and has an outer diameter approximately equal to the outer diameters of the casings 21a and 21b. The antenna cap 22 is disposed between the casing 21a and the casing 21b, and accommodates the antenna 25 therein. As with the antenna cap 22 shown in FIG. 2, the antenna cap 22 accommodate the antenna 25 so that the antenna 25 is disposed outside the casing 21, that is, the casing 21 does not cover the periphery of the antenna 25.

The connectors 23a and 23b are similar to the connector 23 shown in FIG. 2. That is, the connectors 23a and 23b include a plurality of connecting terminals T10 to T12 connected to the circuit. In this way, the two connectors 23a and 23b are provided to make it possible to connect the cable CB from both the upper side (end E1 side) and the lower side (end E2 side) of the antenna module 20. One of the connectors 23a and 23b can be omitted.

Figure 8:
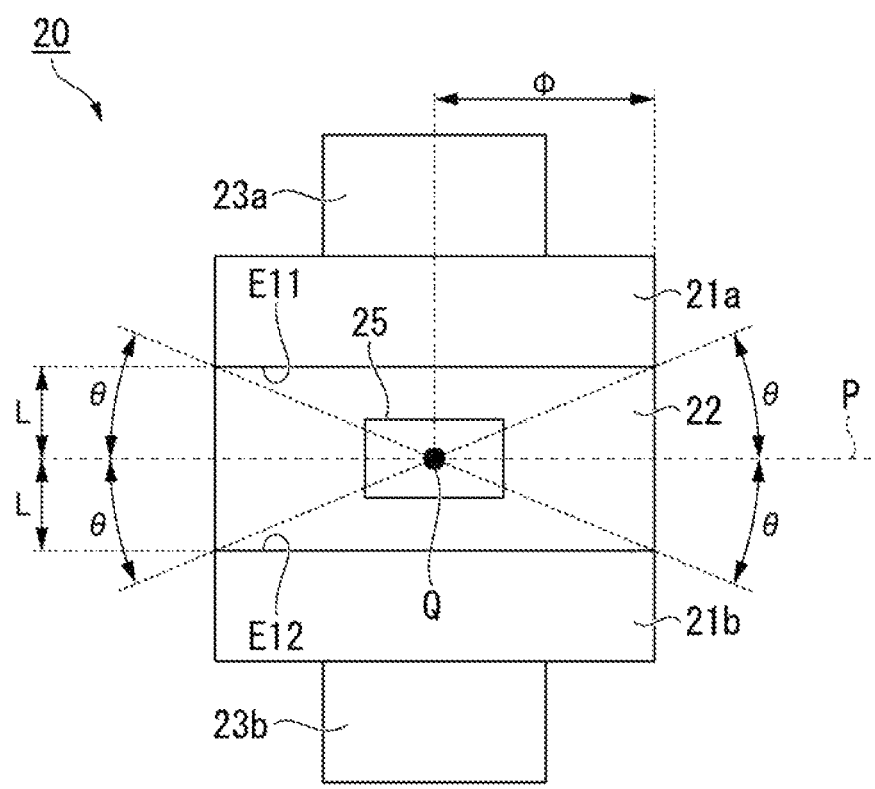
FIG. 8 is a view showing an attaching position of the antenna of the antenna module according to the third embodiment of the present invention.

FIG. 8 is a view showing an attaching position of the antenna of the antenna module according to the third embodiment of the present invention. In the present embodiment, for the sake of simplicity of explanation, a case in which the antenna 25 is omni-directional within the reference plane P will be described as an example. As shown in FIG. 8, the reference plane P is orthogonal to the axis of the casing 21 (casings 21a and 21b) and includes a feeding point Q of the antenna 25. A 3 dB half value angle of the antenna 25 based on the reference plane P is defined as θ, and the outer radius of the casing 21 is defined as φ. When the outer diameter shape of the casing 21 is a cylindrical shape, the outer radius φ is defined as shown in FIG. 3B, and when the outer diameter shape of the casing 21 is a rectangular tubular shape, the outer radius φ is defined as shown in FIG. 3C.

The antenna 25 is attached to a position at which a distance between the feeding point Q and the end E11 of the casing 21a, and a distance between the feeding point Q and the end E12 of the casing 21b in the axial direction of the casing 21 become the shortest distance L indicated by the aforementioned formula (2). That is, in the first embodiment, since the antenna 25 is accommodated in the antenna cap 22 provided at one end of the casing 21, the attaching position of the antenna 25 is determined in consideration of the influence of the casing 21. In contrast, in the present embodiment, since the antenna 25 is accommodated in the antenna cap 22 disposed between the casing 21a and the casing 21b, the attaching position of the antenna 25 is determined in consideration of the influences of the casings 21a and 21b. As long as unnecessary radiation is acceptable, the antenna 25 may be attached to a position at which the distance between the feeding point Q and at least one of the casings 21a and 21b is slightly longer than the shortest distance L.

The antenna module 20 of the present embodiment differs from the antenna module 20 of the first and second embodiments only in the attaching position of the antenna 25 and the number of the connectors, and has the same function. Therefore, the antenna module 20 of the present embodiment is provided with the gateway F1 and the backbone router F3 as well as the system manager F2 as in the first and second embodiments, and the function of forming the wireless network N1, the function of connecting the wireless network N1 to the network N2, and the function of managing the wireless network N1 are realized by the antenna module 20 alone. Therefore, it is possible to realize an antenna module which is compact, lightweight and easy to install, and the low cost and the low power consumption can be achieved.

Although the antenna module according to some embodiments of the present invention has been described above, the present invention is not limited to the aforementioned embodiments, and can be freely changed within the scope of the present invention. For example, in the above-described embodiment, an example in which the power supply 32 is provided in the remote terminal device 30, and the electric power is supplied from the remote terminal device 30 to the antenna module 20 has been described. However, the power supply may be provided in the antenna module 20.

In the above embodiment, an example in which the gateway F1, the system manager F2, and the backbone router F3 are provided in the circuit 24 has been described. However, the gateway F1, the system manager F2, and the backbone router F3 may not necessarily be provided in the circuit 24. For example, the gateway F1, the system manager F2, and the backbone router F3 may be provided outside the circuit 24, while being accommodated in the casing 21.

The antenna module of the present invention may be expressed as follows.

An antenna module which transmits and receives radio signals via a wireless network, the antenna module including:

an antenna which transmits and receives the radio signals;

a circuit which converts a signal received from outside into the radio signals, transmits the converted radio signals from the antenna, and transmits a signal generated by processing the radio signals received by the antenna to the outside;

a tubular casing which accommodates the circuit to cover the periphery of the circuit;

an antenna accommodator provided between one end or both ends of the casing to accommodate the antenna so that transmission and reception of radio signals are allowed;

a connector joined to the casing and connectable to an external device which transmits and receives the signal to and from the circuit;

a router which relays the signal processed by the circuit; and a gateway which connects the router and the external device connected to the connector in a communicable manner.

In the above embodiment, the wireless device that performs the wireless communication based on ISA 100.11a has been described as an example. However, the present invention is applicable to a wireless device that performs the wireless communication based on WirelessHART (registered trademark), a wireless device that performs the wireless communication based on Wi-Fi (registered trademark), or a wireless device that performs the wireless communication depending on ZigBee (registered trademark). In the above embodiment, an example in which the controller 31 or the terminal device TM as an external device is connected to the antenna module 20 has been described. However, instead of the controller 31 or the like, a distributed control system (DCS), a scanner (SCADA), a recorder, or the like may be connected as an external device.

What is claimed is:
1. A wireless communication system, comprising:
at least one wireless field device;
an external device; and
an antenna module which transmits to and receives from the wireless field device a radio signal via a wireless network and transmits to and receives from the external device a wired signal, the antenna module comprising:
an antenna configured to transmit to and receive from the wireless field device the radio signal;
a circuit configured to convert a signal received from the external device into a radio signal, make the antenna transmit the converted radio signal, and transmit a signal generated by processing the radio signal received by the antenna to the external device;
a tubular casing configured to accommodate the circuit to cover a periphery of the circuit;
an antenna accommodator provided at one end of the casing and configured to accommodate the antenna to allow the antenna to transmit and receive the radio signal;
a connector joined to the casing and connectable to the external device which transmits and receives a signal to and from the circuit;
a router configured to relay the signal processed by the circuit and the signal received by the circuit;
a gateway configured to communicatively connect the router and the external device connected to the connector; and
a manager configured to manage the wireless network,
wherein the circuit comprises:
a transmitter-receiver configured to receive the signal from the external device via the connector, output the signal to the gateway, and transmit a signal, which are output from the gateway, to the external device via the connector; and
a radio signal processor configured to convert a signal, which is output from the router, into a radio signal, make the antenna transmit the converted radio signal, and output the signal generated by processing the radio signal received by the antenna to the router, and
wherein the gateway is configured to output data, which is output from the transmitter-receiver, to the router, and output data, which is output from the router, to the transmitter-receiver,
wherein
the gateway is configured to acquire process data from the wireless field device,
the manager is configured to acquire communication quality information and diagnosis information from the wireless field device and to deliver the acquired communication quality information and the acquired diagnosis information to the gateway, and
the gateway is configured to convert each of the process data, the communication quality information, and the diagnosis information into a signal to be transmitted to the external device, and to output the signal to the transmitter-receiver,
wherein the antenna module is configured to perform an operation of releasing a sleep state when the transmitter-receiver of the circuit receives a request from the external device, and shifting to the sleep state when returning a response to the external device,
wherein
the router is configured to deliver to the manager a join request transmitted from the wireless field device, and
the manager is configured to:
perform a process as to whether the wireless field device is made to enter the wireless network;
transmit a join permission indicating permission of the entry into the wireless network to the wireless field device via the router in a case where the wireless field device is authenticated; and
control allocation of communication resources to the wireless field device, the gateway, and the router.

2. The wireless communication system according to claim 1, wherein the connector comprises a power supply connector connectable to an external power supply.

3. The wireless communication system according to claim 1, wherein the antenna accommodator is configured to accommodate the antenna, the casing not covering a periphery of the antenna.

4. The wireless communication system according to claim 1, wherein, when a 3 dB half value angle of the antenna based on a plane orthogonal to an axis of the casing and including a feeding point of the antenna is set as θ, and an outer radius of the casing is set as φ, a shortest distance L between the feeding point of the antenna and the casing in an axial direction of the casing is represented by the following formula (1):

$$L = \phi \times \tan \theta \ldots \quad (1).$$

5. The wireless communication system according to claim 1, wherein the external device comprises a power supply configured to supply electric power to the antenna module.

6. A wireless communication system, comprising:
at least one wireless field device;
an external device; and
an antenna module which transmits to and receives from the wireless field device a radio signal via a wireless network and transmits to and receives from the external device a wired signal, the antenna module comprising:
an antenna configured to transmit to and receive from the wireless field device the radio signal;
a circuit configured to convert a signal received from the external device into a radio signal, make the antenna transmit the converted radio signal, and transmit a signal generated by processing the radio signal received by the antenna to the external device;
first and second tubular casings, at least one of which being configured to accommodate the circuit to cover a periphery of the circuit;
an antenna accommodator provided between one end of the first casing and one end of the second casing, and configured to accommodate the antenna to allow the antenna to transmit and receive the radio signal;
a first connector joined to the first casing and connectable to the external device which transmits and receives a signal to and from the circuit;
a second connector joined to the second casing and connectable to the external device;
a router configured to relay the signal processed by the circuit and the signal received by the circuit;
a gateway configured to connectively connect the router and the external device connected to the first connector or the second connector and
a manager configured to manage the wireless network,
wherein the circuit comprises:
a transmitter-receiver configured to receive the signal from the external device via the first connector or the second connector, output the signal to the gateway, and transmit a signal, which is output from the gateway, to the external device via the first connector or the second connector; and
a radio signal processor configured to convert a signal, which is output from the router, into a radio signal, make the antenna transmit the converted radio signal, and output the signal generated by processing the radio signal received by the antenna to the router, and wherein the gateway is configured to output data, which is output from the transmitter-receiver, to the router, and output data, which is output from the router, to the transmitter-receiver, wherein the gateway is configured to acquire process data from the wireless field device, the manager is configured to acquire communication quality information and diagnosis information from the wireless field device and to deliver the acquired communication quality information and the acquired diagnosis information to the gateway, and the gateway is configured to convert each of the process data, the communication quality information, and the diagnosis information into a signal to be transmitted to the external device, and to output the signal to the transmitter-receiver, wherein the antenna module is configured to perform an operation of releasing a sleep state when the transmitter-receiver of the circuit receives a request from the external device, and shifting to the sleep state when returning a response to the external device, wherein the router is configured to deliver to the manager a join request transmitted from the wireless field device, and the manager is configured to:

perform a process as to whether the wireless field device is made to enter the wireless network;

transmit a join permission indicating permission of the entry into the wireless network to the wireless field device via the router in a case where the wireless field device is authenticated; and control allocation of communication resources to the wireless field device, the gateway, and the router.

7. The wireless communication system according to claim 6, wherein each of the first connector and the second connector comprises a power supply connector connectable to an external power supply.

8. The wireless communication system according to claim 6, wherein the antenna accommodator is configured to accommodate the antenna, the first casing and the second casing not covering a periphery of the antenna.

9. The wireless communication system according to claim 6, wherein, when a 3 dB half value angle of the antenna based on a plane orthogonal to axes of the first casing and the second casing and including a feeding point of the antenna is set as $\theta$, and an outer radius of each of the first casing and the second casing is set as $\phi$, a shortest distance L between the feeding point of the antenna and each of the first casing and the second casing in an axial direction of the first casing and the second casing is represented by the following formula (2):

$$L=\phi \times \tan \theta \ldots \quad (2).$$

10. The wireless communication system according to claim 6, wherein the external device comprises a power supply configured to supply electric power to the antenna module.

* * * * *